US006977800B2

United States Patent
Cyrille et al.

(10) Patent No.: US 6,977,800 B2
(45) Date of Patent: Dec. 20, 2005

(54) MAGNETIC READ HEAD WITH DUAL LAYER LEAD

(75) Inventors: Marie-Claire Cyrille, San Jose, CA (US); Frederick Hayes Dill, South Salem, NY (US); Kuok San Ho, Santa Clara, CA (US); Jui-Lung Li, San Jose, CA (US); Scott Arthur MacDonald, San Jose, CA (US); James L. Nix, Gilroy, CA (US); Ching Hwa Tsang, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 136 days.

(21) Appl. No.: 10/629,513

(22) Filed: Jul. 29, 2003

(65) Prior Publication Data

US 2005/0024782 A1 Feb. 3, 2005

(51) Int. Cl.⁷ .................................................. G11B 5/33
(52) U.S. Cl. ..................................................... 360/322
(58) Field of Search ............................... 360/322, 313, 360/110

(56) References Cited

U.S. PATENT DOCUMENTS

| 6,813,121 | B2 * | 11/2004 | Pinarbasi ..................... 360/322 |
| 2003/0053265 | A1 * | 3/2003 | Terunuma et al. ........... 360/322 |
| 2003/0058587 | A1 * | 3/2003 | Hasegawa et al. ..... 360/324.12 |
| 2004/0027731 | A1 * | 2/2004 | Hasegawa et al. .......... 360/322 |

* cited by examiner

Primary Examiner—Julie Anne Watko
(74) Attorney, Agent, or Firm—John L. Rogitz

(57) ABSTRACT

A read head has a bottom lead made of material that is relatively polish resistant and a top lead layer that polishes down more easily than the bottom layer. With this structure, when the layers are deposited and then polished down, the top layer recesses away from the sensor (and bottom lead layer) in a controlled fashion, providing an acceptable lead structure that reduces the mismatch between the read head physical read width and magnetic read width.

16 Claims, 2 Drawing Sheets

MAGNETIC READ HEAD WITH DUAL LAYER LEAD

FIELD OF THE INVENTION

The present invention relates generally to magnetic read heads.

BACKGROUND OF THE INVENTION

Magnetic read heads are used in hard disk drives to sense magnetic signals from disks spinning beneath the read heads and, thus, to read data on the disks. To control the stability and magnetic moment orientation of the sensor layer of the head, a bias field can be provided by hard bias magnet layers that are disposed next to the sensor layer at its two side edges.

As recognized by the present invention, a mismatch can occur between the physical read width of a read sensor and its magnetic read width. Generally, for longitudinal recording, the magnetic read width is larger than the physical read width, meaning that to achieve small magnetic read widths to facilitate denser data storage, the physical dimension of the read head must be made even smaller. This complicates manufacturing of the read head.

A contributing factor to the above-noted mismatch problem is that the electrical lead connecting the read head to external circuitry can have varying degrees of thickness from the center of the sensor to the track edge. One way to address this problem is to make the leads very thin, so that the top surface of the sensor and the top surface of the lead are substantially coplanar. But the present invention understands that such a thin lead produces unacceptably high resistance.

The present invention further understands that to alleviate the high resistance problem posed by a single very thin lead, an upper lead layer can be deposited on the thin lead. However, this in turn creates its own problem, namely, that the upper lead layer requires critical alignment that can exceed the capacity of the fabrication tooling, and in particular the overlay capacity of steppers. Poor overlay can result in sensor shorting. Moreover, the process can be jeopardized by poor resist undercut control, leading to so-called "fences" that might cause shorts, ESD sensitivity, and gap flare and, thus, detract from read head performance.

Having recognized the above problems, the solution herein is provided.

SUMMARY OF THE INVENTION

A structure for a magnetic read head includes a read sensor and a bottom lead layer juxtaposed with the sensor. The bottom lead layer has a first polish resistance. A top lead layer is juxtaposed with the bottom lead layer and has a second polish resistance that is less than the first polish resistance.

In a preferred embodiment, the bottom lead layer is electrically connected to the sensor and the top lead layer is electrically connected to the bottom lead layer. The bottom lead layer can include Rhodium (Rh) and the top lead layer can include Tantalum (Ta). Or, the bottom lead layer can include Tantalum (Ta) and the top lead layer Tungsten (W). Other bottom-top layer combinations can include Tantalum (Ta)/Copper (Cu), Gold (Au)/Copper (Cu), and Rhodium (Rh)/Aluminum (Al). The preferred bottom lead layer defines a thickness that is about the same as the thickness of the sensor. As disclosed further below, in the preferred embodiment the top lead layer is recessed away from the sensor relative to the bottom lead layer.

If desired, a hard bias magnet layer may be under the bottom lead layer opposite the top lead layer. Also, if desired an upper protective layer can cover the top lead layer opposite the bottom lead layer.

In another aspect, a method for making a read head includes establishing a sensor on a substrate, and establishing a first lead layer having a first polish characteristic next to the sensor. The method further includes establishing a second lead layer having a second polish characteristic next to the first layer. The layers are polished for a time such that the second lead layer is recessed away from the sensor and the first lead layer is not.

In still another aspect, a data storage device includes a data-bearing medium and a magnetic read head juxtaposed with the data-bearing medium. The read head includes a sensing structure supported by a substrate, and a hard bias magnet layer juxtaposed with the sensing structure. A controller receives signals from the sensing structure that are representative of data stored on the data-bearing medium. A lead structure connects the sensing structure to the controller. As set forth further below, the lead structure includes a first lead layer juxtaposed with the sensing structure and having a relatively low polish rate. Also, the lead structure includes a second lead layer juxtaposed with the first lead layer and having a relatively high polish rate.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
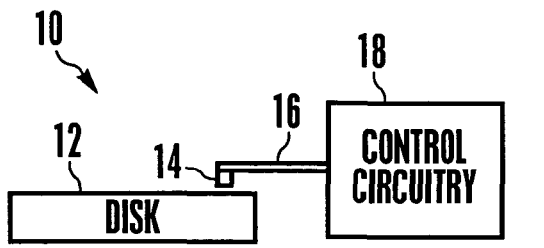
FIG. 1 is a schematic block diagram of a magnetic read head in a hard disk drive apparatus.

Referring initially to FIG. 1, a storage device 10 is shown that includes a data bearing medium such as one or more magnetic disks 12 and at least one magnetic read head 14 positioned for sensing signals (and, thus, for reading data) from the disk 12. The read head 14 may be positioned on an arm 16 that is controlled by circuitry 18 in accordance with principles known in the art.

Figure 2:
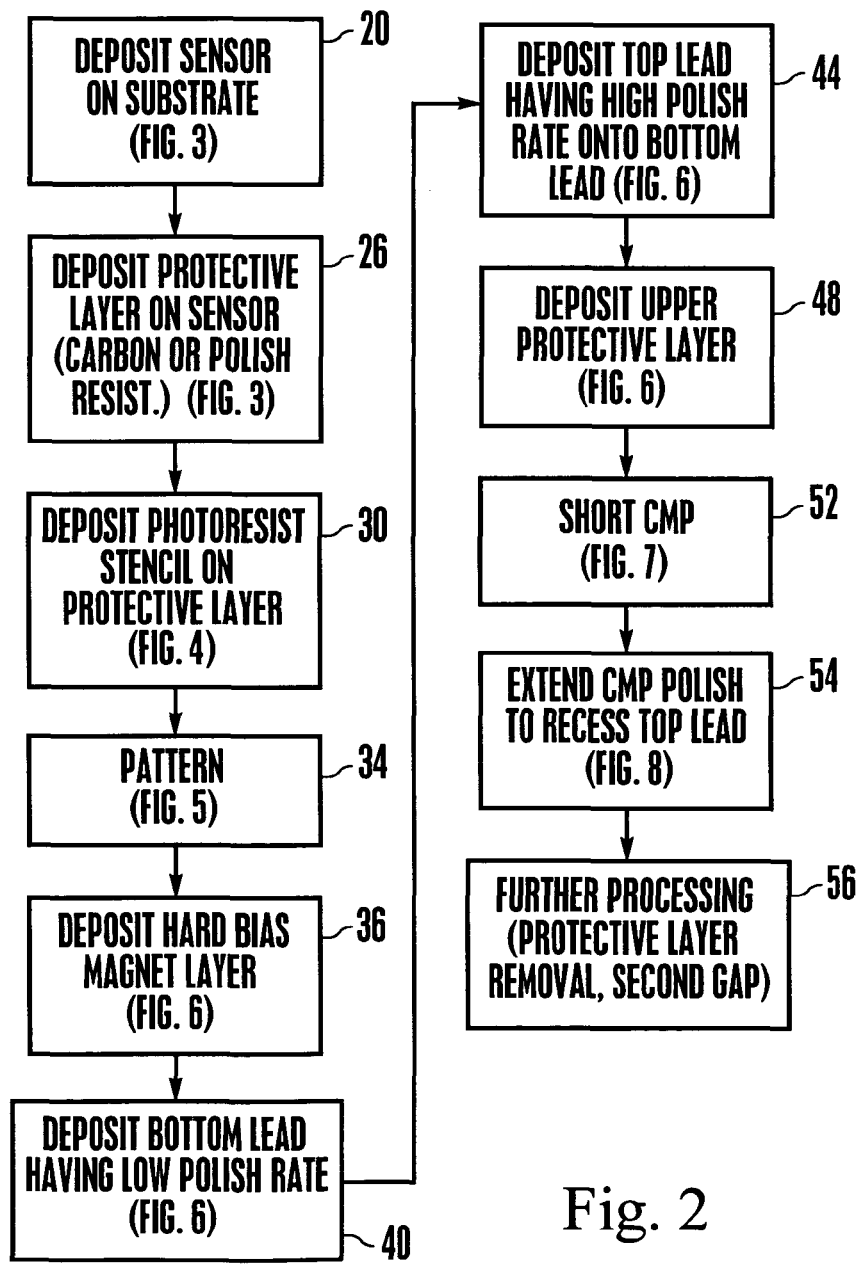
FIG. 2 is a flow chart of the present process.
Figure 3:
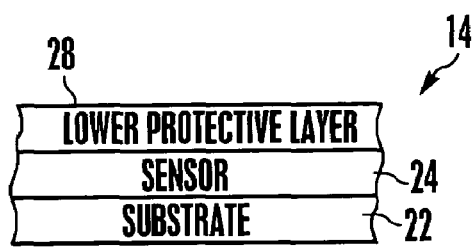
FIG. 3 is a schematic side view of read head after sensor and lower protective layer deposition.

The details of the process for making present MR head-related invention can be seen in FIG. 2, which sets forth presently preferred steps and materials. Commencing at block 20 and cross-referencing FIG. 3, a substrate 22 is provided on which a sensor 24 is deposited by means known in the art. While the term "sensor" and "sensing structure" are used herein, it is to be understood that the sensor 24 can be a stack of layers or a single sensing layer in accordance with, e.g., MR and/or GMR principles known in the art. At block 26 in FIG. 2, a protective layer 28 is deposited on the sensor 24. The protective layer 28 can be Carbon (e.g., diamond-like Carbon) or other polish-resistant material.

Figure 4:
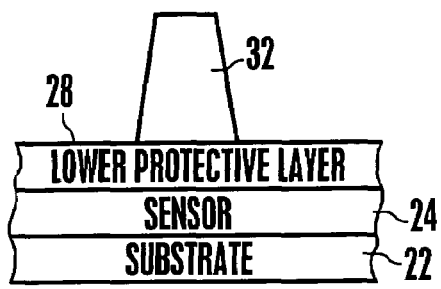
FIG. 4 is a schematic side view of read head after photoresist layer deposition.
Figure 5:
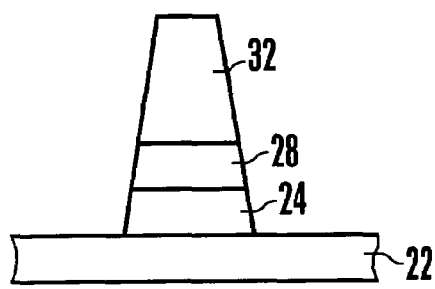
FIG. 5 is a schematic side view of read head after patterning.

Proceeding to block 30 and referring to FIG. 4, a photoresist stencil 32 is deposited on the lower protective layer 28 and as shown in FIG. 5 is then used to shield the underlying structure to form a pattern. The patterning can be done in the preferred non-limiting embodiment by lithography in combination with other processes including, e.g., chemical mechanical polishing (CMP), ion mill processing, etching, or other appropriate process. For example, when removing portions of the lower protective layer 28, reactive ion etching can be used. Then, when removing portions of the sensor 24, ion milling can be used.

Figure 6:
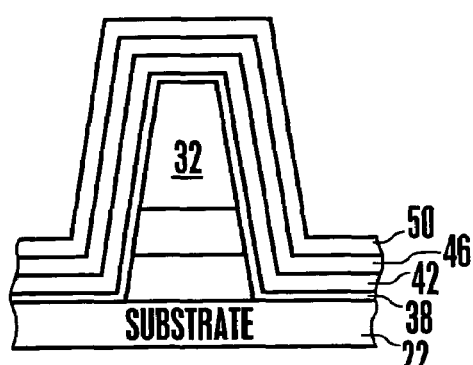
FIG. 6 is a schematic side view of read head after deposition of the hard bias magnet layer, the bottom lead layer, top lead layer, and upper protective layer.

Proceeding to block 36 and now referring to FIG. 6, a hard bias magnet layer 38 can be deposited over the sensor 24 and patterned structure as shown, if desired. The hard bias magnet layer 38 is a permanent magnet material that is used to maintain the sensor 24 correctly magnetically oriented. Then, at block 40 a bottom electrically conductive lead layer 42 is deposited over the hard bias magnet layer 38. In accordance with the present invention, the bottom lead layer is relatively resistant to CMP. Stated differently, the bottom lead layer 42 has a relatively low polish rate. In a preferred non-limiting embodiment, the bottom lead layer 42 may be made of Rhodium (Rh).

Also, as indicated at block 44 of FIG. 2 and as shown in FIG. 6, a top electrically conductive lead layer 46 is deposited over the bottom lead layer 42. As intended by the present invention, the top lead layer 46 is less polish resistant than the bottom lead layer 42. The top lead layer 46 has a relatively high polish rate. The top lead layer 46 may be made of Tantalum (Ta). Or, the bottom lead layer 42 can be made of Tantalum (Ta) and the top lead layer 46 can be made of Tungsten (W). Other bottom-top layer 42, 46 combinations can include Tantalum (Ta)/Copper (Cu), Gold (Au)/Copper (Cu), and Rhodium (Rh)/Aluminum (Al).

If desired, at block 48 an upper protective layer 50 may be deposited over the top lead layer 46.

Figure 7:
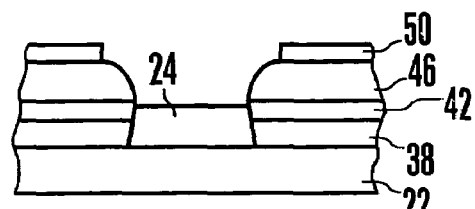
FIG. 7 is a schematic side view of read head after a short CMP exposing the lower protective layer.
Figure 8:
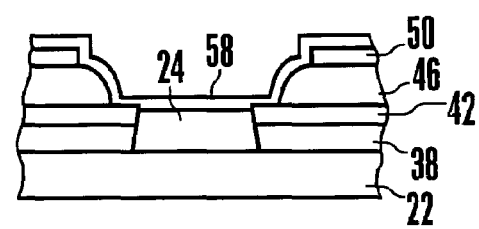
FIG. 8 is a schematic side view of read head after extended CMP to recess the top lead layer.

Proceeding to block 52 of FIG. 2 and referring now to FIG. 7, CMP may be used to remove structure above the sensor 24, followed by a longer CMP at block 54 to recess the top lead layer 46. Specifically, a substantially flat gap is created at the junction between the lower lead layer 42 and the sensor 24 during the initial CMP as shown in FIG. 7, with the extended CMP recessing the edges of the top lead layer 46 away from the edges of the sensor 24 as shown in FIG. 8. FIGS. 7 and 8 show that the top lead layer 46 is relatively thick compared to the bottom lead layer 42, which has a thickness that is substantially the same as the thickness of the sensor 24 as shown.

To amplify on the above discussion, during the process at blocks 52 and 54 (which can be a continuous uninterrupted process), during polishing, the photoresist layer 32 (and its vertically adjacent layers) is removed first, followed by the upper protective layer 50, which starts to recess from the junction. The top lead layer 46, having a high polish rate, recesses away from the junction with the upper protective layer 48, while the bottom lead layer 42, being more polish resistant, remains intact. The amount of recession of the top lead layer 46 is determined by the length of the polish time. The preferred non-limiting CMP may use a soft abrasive (such as colloidal silica) in a slurry.

Further processing may be undertaken at block 56, including removal of protective layers, depositing the so-called "gap 2" layer 58 (which owing to the present configuration of lead layers advantageously has a flat top surface as shown), and so on.

It may now be appreciated that the present invention facilitates the definition of a sensor track width, a flat read gap region, and sufficiently thick lead structures to produce acceptable sensor resistance. Using CMP with a thin bottom lead layer 42 gives a reliable method for generating fence-free lift-off structures that have a flat gap at the junction. Further, the use of a relatively thick top lead layer 46 with a higher polish rate than the bottom lead layer 42 facilitates control of the definition of lead stitch by appropriately establishing CMP time, with all of the above advantages being realized in a single manufacturing step.

Figure 9:
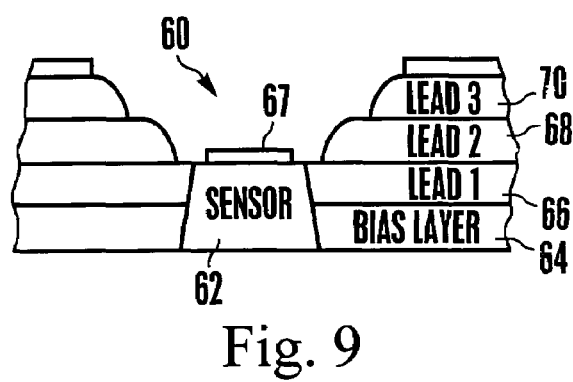
FIG. 9 is a schematic side view of an alternate "lead overlay" read head to show that the present invention can apply equally to such configurations.

FIG. 9 shows that the dual lead layer invention disclosed herein may be applied to a read head 60 having a so-called lead overlay configuration. Specifically, a sensor 62 with bias layer 64 can be established in accordance with the disclosure above in blocks 20–36 of FIG. 2. A first lead layer 66 can then be deposited and formed. Then, a hard Carbon layer 67 and second photoresist mask (not shown) can be deposited and shaped above the sensor 62 but narrower than the sensor 62, and bottom and top lead layers 68, 70 (respectively labeled "Lead 2" and "Lead 3" in FIG. 9) in accordance with the present invention can be deposited over the photoresist. That is, the bottom lead layer 68 has more polish resistance than the top lead layer 70. CMP is then employed to remove the photoresist and portions of the lead layers 68, 70 to yield the configuration shown in FIG. 9, wherein the bottom lead layer 68 ("Lead 2") partially overlaps the top of the sensor 62 as shown.

While the particular MAGNETIC READ HEAD WITH DUAL LAYER LEAD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A structure for a magnetic read head, comprising:
   at least one read sensor;
   at least a first lead layer juxtaposed with the sensor, the first lead layer having a first polish resistance; and
   at least a second lead layer juxtaposed with the first lead layer and being disposed further away from the sensor than is the first lead layer, the second lead layer having a second polish resistance less than the first polish resistance, wherein the first lead layer includes Rhodium (Rh) and the second lead layer includes Tantalum (Ta).

2. The structure of claim 1, wherein the first lead layer is electrically connected at least to the sensor and the second lead layer is electrically connected at least to the first lead layer.

3. The structure of claim 1, wherein the first lead layer defines a thickness and the sensor defines a thickness substantially equal to the thickness of the first lead layer.

4. The structure of claim 1, wherein the second lead layer is recessed away from the sensor relative to the first lead layer.

5. The structure of claim 1, comprising at least one bard bias magnet layer under the first lead layer opposite the second lead layer.

6. The structure of claim 1, comprising at least one upper protective layer covering the second lead layer opposite the first lead layer.

7. A magnetic read head assembly comprising:
   at least one sensing structure supported by a substrate;
   at least one hard bias magnet layer juxtaposed with the sensing structure;
   at least one controller receiving signals from the sensing structure representative of data stored on a magnetic disk closely spaced from the sensing structure; and
   a lead structure connecting the sensing structure to the controller, the lead structure including:
      at least a first lead layer juxtaposed with the sensing structure, the first lead layer having a relatively low removal rate; and
      at least a second lead layer having a relatively high removal rate, the sensing structure being closer to the first lead layer than to the second lead layer, wherein the lead layers are selected from the group of combinations consisting of: first lead layer Rhodium (Rh) second lead layer Tantalum (Ta), first lead layer Rhodium (Rh) second lead layer Aluminum (Al), first lead layer Tantalum (Ta) second lead layer Cooper (Cu), first lead layer Gold (Au) second lead layer Copper (Cu).

8. The magnetic read head assembly of claim 7, wherein the first lead layer is electrically connected at least to the sensing structure and the second lead layer is electrically connected at least to the first lead layer.

9. The magnetic read head assembly of claim 7, wherein the first lead layer defines a thickness and the sensing structure defines a thickness substantially equal to the thickness of the first lead layer.

10. The magnetic read head assembly of claim 7, wherein the second lead layer is recessed away from the sensing structure relative to the first lead layer.

11. The magnetic read head assembly of claim 7, comprising at least one hard bias magnet layer under the first lead layer opposite the second lead layer.

12. The magnetic read head assembly of claim 7, comprising at least one upper protective layer covering the second lead layer opposite the first lead layer.

13. The magnetic read head assembly of claim 7, wherein the first lead layer is Rhodium (Rh) and the second lead layer is Tantalum (Ta).

14. The magnetic read head assembly of claim 7, wherein the first lead layer is Rhodium (Rh) and the second lead layer is Aluminum (Al).

15. The magnetic read assembly of claim 7, wherein the first lead layer is Tantalum (Ta) and the second lead layer is Copper (Cu).

16. The magnetic read assembly of claim 7, wherein the first lead layer is Gold (Au) and the second lead layer is Copper (Cu).

* * * * *